US 011370316B2

(12) United States Patent
Weisshar et al.

(10) Patent No.: US 11,370,316 B2
(45) Date of Patent: Jun. 28, 2022

(54) CONTACT DEVICE AND RAPID CHARGING SYSTEM

(71) Applicant: Schunk Transit Systems GmbH, Wettenberg (DE)

(72) Inventors: Bjoern Weisshar, Oberkleen (DE); Thomas Hengstermann, Rheine (DE); Lothar Schneider, Lahnau (DE); Matthias Domes, Bad Nauheim (DE)

(73) Assignee: Schunk Transit Systems GmbH, Wettenberg (DE)

( * ) Notice: Subject to any disclaimer, the term of this patent is extended or adjusted under 35 U.S.C. 154(b) by 0 days.

(21) Appl. No.: 17/054,684

(22) PCT Filed: Jan. 15, 2019

(86) PCT No.: PCT/EP2019/050942
§ 371 (c)(1),
(2) Date: Nov. 11, 2020

(87) PCT Pub. No.: WO2019/223906
PCT Pub. Date: Nov. 28, 2019

(65) Prior Publication Data
US 2021/0070187 A1 Mar. 11, 2021

(30) Foreign Application Priority Data
May 24, 2018 (DE) .................. 10 2018 112 494.5

(51) Int. Cl.
*B60L 53/36* (2019.01)
*B60L 53/16* (2019.01)
*H01R 13/22* (2006.01)
(52) U.S. Cl.
CPC ............. *B60L 53/36* (2019.02); *B60L 53/16* (2019.02); *H01R 13/22* (2013.01)

(58) Field of Classification Search
CPC .......... B60L 53/36; B60L 53/16; H01R 13/22
(Continued)

(56) References Cited

U.S. PATENT DOCUMENTS

| 5,495,159 A | 2/1996 | Shiraishi |
| 5,523,666 A * | 6/1996 | Hoelzl ................. H02J 7/0042 320/109 |
| 2010/0235006 A1 | 9/2010 | Brown |

(Continued)

FOREIGN PATENT DOCUMENTS

| DE | 102008056610 A1 | 5/2010 |
| DE | 102009001080 A1 | 8/2010 |

(Continued)

OTHER PUBLICATIONS

Fraunhofer IVI; Simulation tool determines the $CO_2$ emissions from air conditioning in buses; www.ivi.frauenhofer.de; 2017; Germany.

(Continued)

*Primary Examiner* — Suresh Memula
(74) *Attorney, Agent, or Firm* — Dickinson Wright PLLC; Andrew D. Dorisio

(57) ABSTRACT

A contact device for a fast charging system for electrically driven vehicles includes a charging contact device disposable on a vehicle floor, the contact device having a contact unit carrier with contact units electrically connectable to a respective charging contact of the charging contact device to form a contact pair, the contact device or the charging contact device including a positioning device, the contact units positionable relative to the charging contacts by the positioning device to form an electrically conductive connection between the vehicle and a stationary charging station, the contact device being disposable on a ground below the vehicle, the contact device having a base frame attachable to the ground, the contact unit carrier being inserted into (Continued)

the base frame, the contact unit carrier being made of a dielectric material, the contact units each having a contact element moveable relative to the contact unit carrier.

20 Claims, 6 Drawing Sheets

(58) Field of Classification Search
USPC .......................................................... 320/109
See application file for complete search history.

(56) References Cited

U.S. PATENT DOCUMENTS

| | | | |
|---|---|---|---|
| 2011/0133692 A1* | 6/2011 | Shimoyama | B60L 53/126 |
| | | | 320/108 |
| 2013/0012044 A1 | 1/2013 | Maurer et al. | |
| 2013/0175987 A1* | 7/2013 | Amma | H01M 10/44 |
| | | | 320/108 |
| 2014/0091757 A1* | 4/2014 | Proebstle | B60L 53/22 |
| | | | 320/108 |
| 2014/0266021 A1* | 9/2014 | Paladeni | H02J 50/90 |
| | | | 320/108 |
| 2017/0106762 A1 | 4/2017 | Dow et al. | |
| 2018/0015836 A1* | 1/2018 | Madon | B60L 53/16 |
| 2018/0375367 A1* | 12/2018 | Saita | B60L 53/126 |
| 2020/0180448 A1* | 6/2020 | Boecker | H02J 7/0013 |

FOREIGN PATENT DOCUMENTS

| | | | | |
|---|---|---|---|---|
| DE | 102010054909 A1 | | 6/2012 | |
| DE | 102012007713 A1 | * | 10/2012 | ............... B60L 53/16 |
| DE | 102014200290 A1 | | 7/2015 | |
| DE | 102015219438 A1 | | 4/2017 | |
| DE | 202017106747 U1 | * | 2/2018 | ............... B60L 53/14 |
| DE | 102017218226 A1 | | 9/2018 | |
| DE | 102018004418 A1 | * | 11/2018 | ............... B60L 53/14 |
| EP | 2039557 A1 | | 3/2009 | |
| EP | 2090457 A2 | | 8/2009 | |
| EP | 3031658 A1 | * | 6/2016 | ............... B60L 53/62 |
| GB | 2526118 A | * | 11/2015 | ............... B60L 1/003 |
| WO | 2011063959 A1 | | 6/2011 | |
| WO | 2012079668 A2 | | 6/2012 | |
| WO | WO-2014156145 A1 | * | 10/2014 | ............ B60L 53/126 |
| WO | WO-2015001745 A1 | * | 1/2015 | ............... H02J 50/12 |
| WO | 2015018889 A1 | | 2/2015 | |
| WO | 2015104080 A1 | | 7/2015 | |
| WO | 2017060172 A1 | | 4/2017 | |
| WO | 2018086884 A1 | | 5/2018 | |

OTHER PUBLICATIONS

Electric Vehicle conductive charging system; DKE Deutsche Kommission Elektrotechnik Elektronik Informationstechnik; 2008; Germany.
Fraunhofer IVI; Automated Quick Charge; www.ivi.fraunhofer.de; Germany.
Emove360 Award 2017; for Electric Mobility & Autonomous Driving; www.emove360.com; Germany.
Road vehicles—Vehicle to grid communication interface; European Standard; EN ISO 15118-1; Aug. 2015.

* cited by examiner

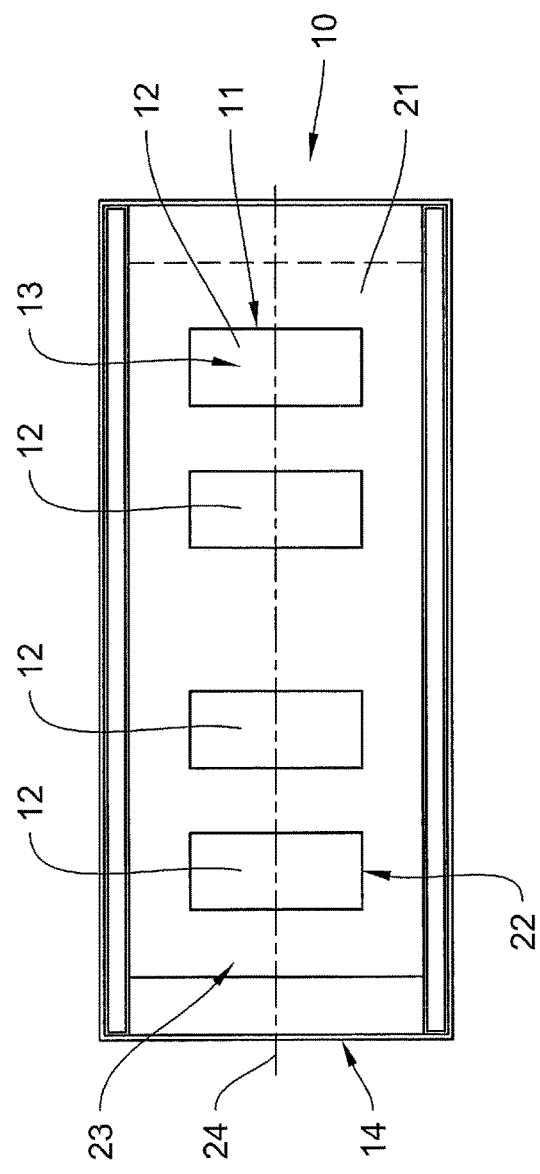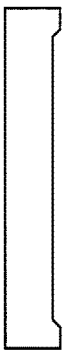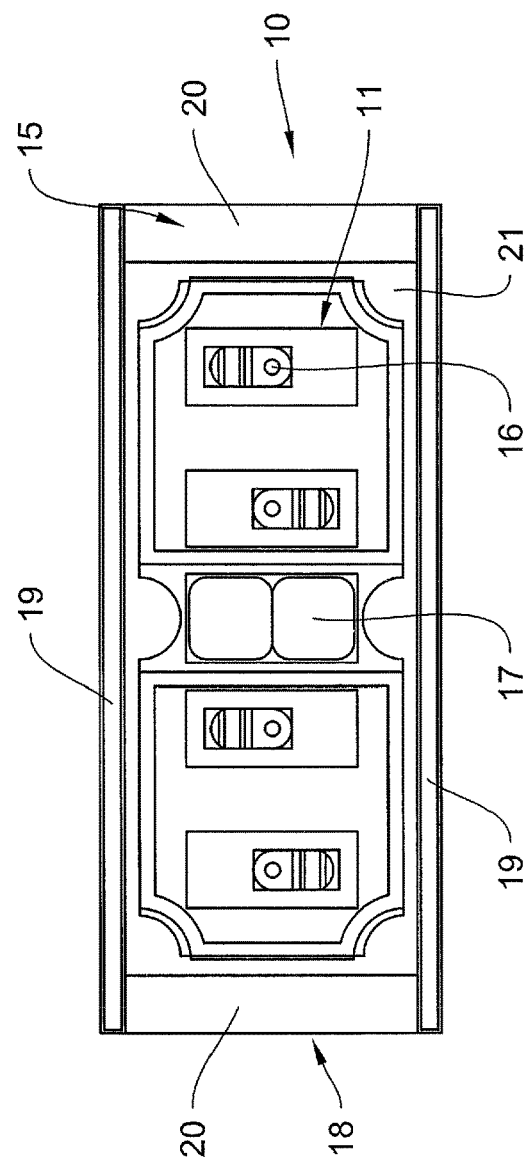

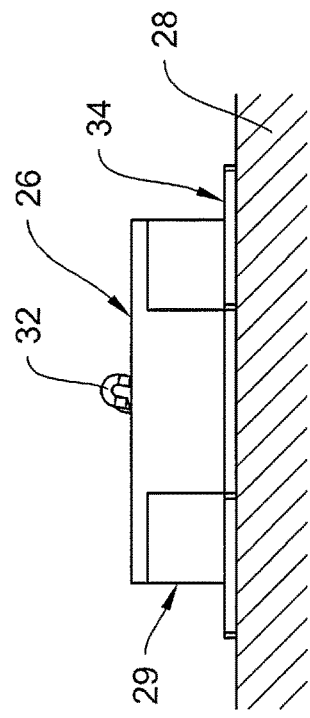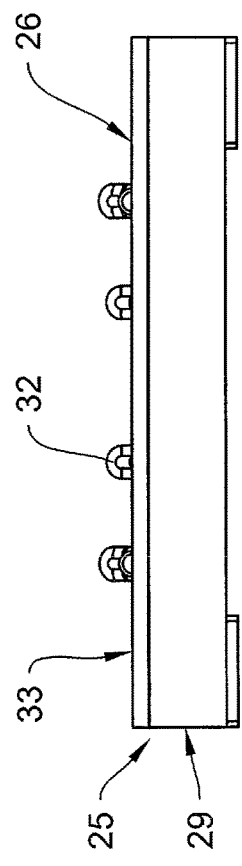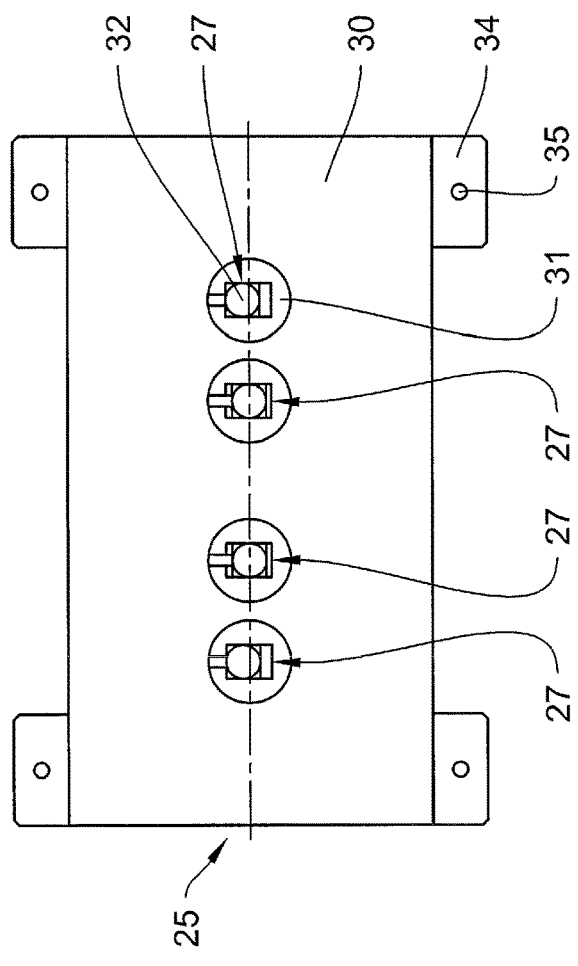

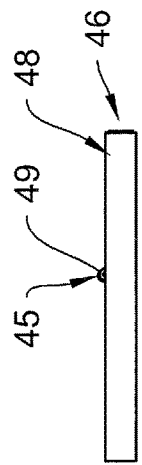
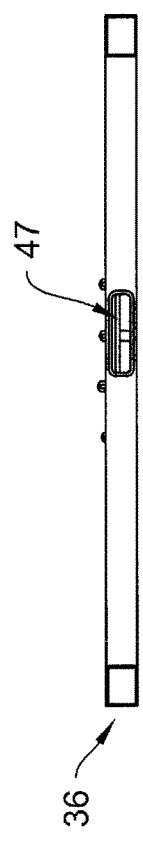
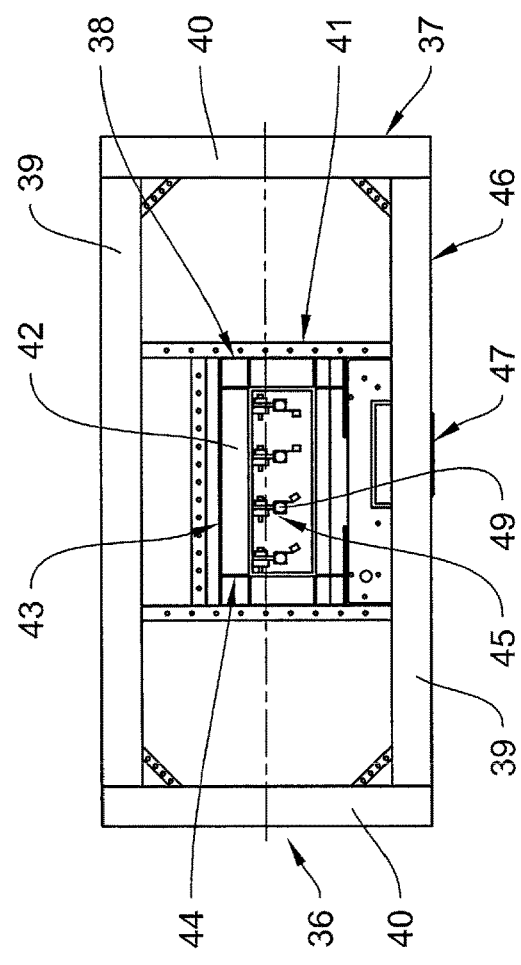

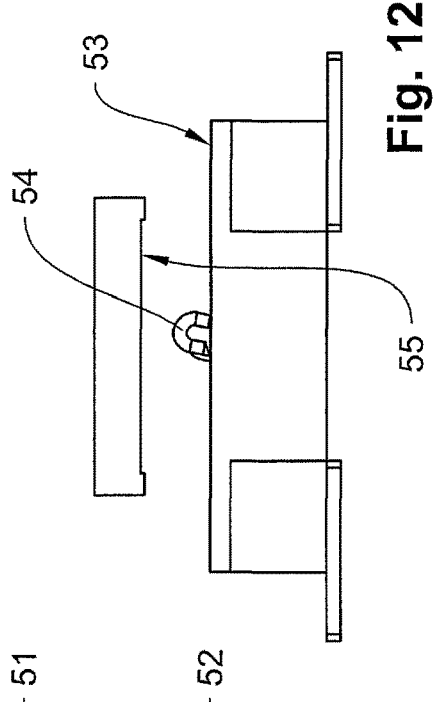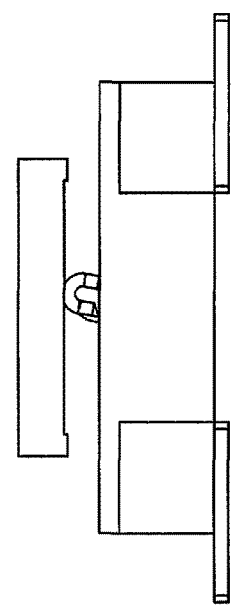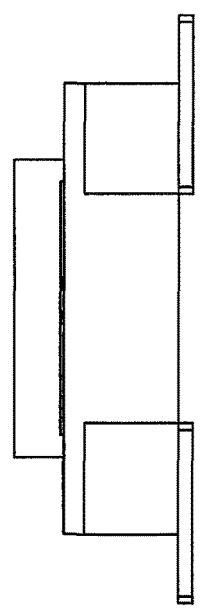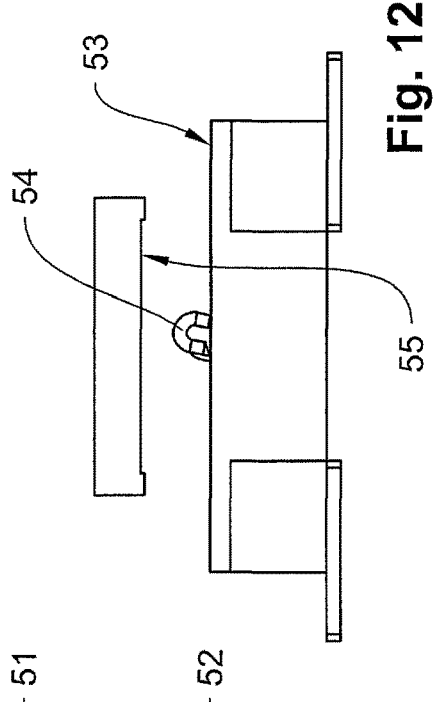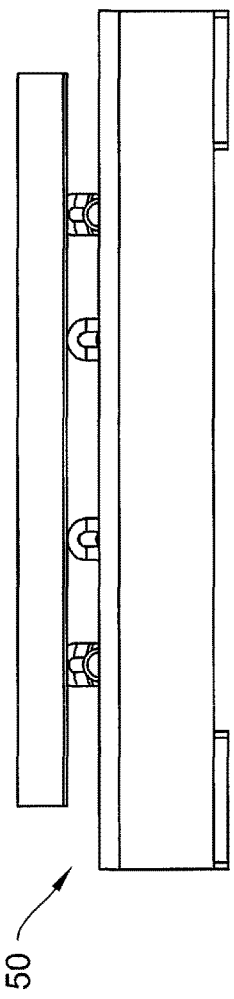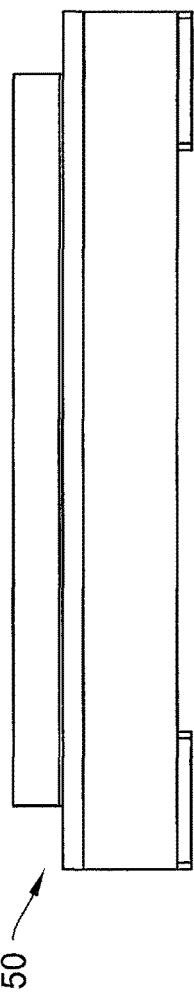

CONTACT DEVICE AND RAPID CHARGING SYSTEM

FIELD OF THE INVENTION

The invention relates to a contact device for a fast charging system and a fast charging system for electrically driven vehicles, in particular cars, trucks, busses or the like, the fast charging system comprising a charging contact device which is disposable on a vehicle floor of a vehicle and the contact device having a contact unit carrier, the contact unit carrier having contact units, each contact unit being electrically connectable to a respective charging contact of the charging contact device to form a contact pair, the contact device or the charging contact device comprising a positioning device, the contact units being positionable relative to the charging contacts by means of the positioning device in such a manner that an electrically conductive connection is formed between the vehicle and a stationary charging station.

BACKGROUND OF THE INVENTION

Contact devices and fast charging systems of this kind are known from the state of the art and are typically employed for fast charging of electrically driven vehicles at a stop, for instance. A distinction is made between fast charging systems which are disposed on a vehicle roof or below a vehicle floor. From WO 2015/018889 A1, a fast charging system is known in which a matching contact unit carrier of a contact device is brought into contact with a roof-shaped charging contact device. The contact unit carrier is guided into a contact position, contact elements in the contact unit carrier sliding along roof-shaped inclines of the charging contact device and the contact unit carrier becoming centered in the charging contact device. The contact device and the charging contact device are joined by means of a positioning device which is disposed on the vehicle roof in the manner of a rocker. A fast charging of batteries of the vehicle can take place during a stop of the vehicle at a stationary charging station. Contact pairs are then formed for a charging circuit and for a control line, grounding or data transmission, for instance. It is therefore envisaged that a plurality of contact units is always contacted with assigned charging contacts.

On some types of vehicles, cars for instance, the fast charging system is provided below a vehicle for practical and aesthetical reasons. It is also possible to use this position for trucks or busses. Fast charging systems known from the state of the art which are realized for transmitting high currents, such as 500 A to 1,000 A at a voltage of 750 V, always require contacts units to have correspondingly large dimensions and corresponding conductor cross sections. Furthermore, a corresponding positioning device for the contact unit carrier must then be disposed below a vehicle. Contact devices known from the state of the art are therefore always installed within a ground onto which the vehicle can drive. This means that for assembling the contact device, a cavity or a similar cutout is formed in the ground in order to be able to accommodate the positioning device along with the contact unit carrier, connection cables, etc. below the vehicle. This is always associated with great effort, however, because the ground then requires structural measures to be carried out. By contrast, it is advantageous that the contact device can be disposed at ground level.

In a particularly simple embodiment, a charging system can consist of a plug-socket connection; however, only low currents can be transmitted in this case, prolonging a charging time. Furthermore, the plug and the socket must be coupled manually by an operator and special requirements for electrical safety and the protection of individuals must be adhered to, which is not the case for automatic fast charging systems out of the reach of persons.

SUMMARY OF THE INVENTION

Therefore, the object of the present invention is to propose a contact device and a fast charging system that are easy to use and cost-effective.

This object is attained by a contact device having the features of claim 1 and a fast charging system having the features of claim 15.

In the contact device according to the invention for a fast charging system for electrically driven vehicles, in particular cars, trucks, busses or the like, the fast charging system comprises a charging contact device which is disposable on a vehicle floor of a vehicle and the contact device having a contact unit carrier, the contact unit carrier having contact units, each contact unit being electrically connectable to a respective charging contact of the charging contact device to form a contact pair, the contact device or the charging contact device comprising a positioning device, the contact units being positionable relative to the charging contacts by means of the positioning device in such a manner that an electrically conductive connection is formed between the vehicle and a stationary charging station, the contact device being disposable on a ground below the vehicle onto which the vehicle can drive, the contact device having a base frame which is attachable to the ground, the contact unit carrier being inserted into the base frame, the contact unit carrier being made of a dielectric material, the contact units each having a contact element which is moveable relative to the contact unit carrier.

Since the contact device is disposable on a ground below the vehicle onto which the vehicle can drive, structural measures on the ground, such as excavating a cavity, are no longer necessary. In this case, the contact device can be flexibly disposed on any accessible ground in a simple manner. In particular, the base frame can be mounted on the ground, for instance by means of screws, the contact unit carrier being inserted into the base frame and being supported by the base frame as a result. Moreover, the contact unit carrier is made of a dielectric material so that current-carrying components are insulated and thus decoupled from the base frame. The contact unit carrier houses the contact elements or the contact units, the contact elements being moveable relative to the contact unit carrier. The contact elements are realized so as to be moveable in order to form an especially reliable contact pair, since the contact elements can then also compensate differences in distance to the charging contacts. This is advantageous because it must be assumed that, depending on the load or type of vehicle, an ideal relative position of charging contacts and contact elements is not always possible.

Because of the simple assembly and disassembly of the contact device on a ground or rather its surface, it is also possible to temporarily arrange or set up the contact device at the stop as needed without great effort. Furthermore, the contact device is flexibly adaptable to different types of vehicles because of its modular design. Thus, an always identically formed base frame can house a contact unit carrier whose contact units are adapted to the type of vehicle in question, take different positions or are themselves formed differently.

The contact device can thus also be advantageously formed so as to be accessible to and/or driven over by the vehicle. The contact device can have the shape of a square or a rectangle such that it fits between pairs of tires of a vehicle. Simultaneously, parts of the contact device or alternatively the whole contact device can be realized so that vehicles can drive over it in such a manner that the vehicle is standing on the contact device with its tires during a charging process. The dimensions of the contact device can also be adjusted to the dimensions of the vehicle, for instance according to the size of a parking bay, in this case.

The base frame can be made of a dielectric material. The base frame can also be made of a plastic material, which is particularly robust and has a high degree of strength.

Alternatively, the base frame can be formed by metal profiles. The base frame, which, for instance, can be formed by metal section tubes which are welded together, then surrounds the contact unit carrier circumferentially, thus creating protection of the contact unit carrier against oncoming vehicles.

The contact unit carrier can be formed by a trough within which the contact units can be disposed. The contact unit carrier can be made of a dielectric plastic material, allowing an especially simple production of a trough. The trough can protect and electrically shield the contact units particularly well against environmental impacts. At the same time, the trough enables the contact units to be arranged in a flexible manner, depending on the type of vehicle to be contacted. At the same time, passage openings can be formed in the trough. In this case, the trough can form a body through which air can flow. If the trough has a number of passage openings, the contact units which are disposed within the trough can simply be cooled by air, such that undesired heating of the contact units as a result of power transmission during a charging process can be reduced in a simple manner. Furthermore, the trough can be light in weight.

Vertical crosspieces to which the contact units can be attached can be formed within the contact unit carrier. The vertical crosspieces can be disposed in the manner of a lattice, so that a plurality of options for mounting contact units are available. When the contact unit carrier is formed by a trough, crosspieces can also be formed within a trough. The contact unit carrier can also be made of a fiber-reinforced plastic material, enabling a particularly simple, stable and inexpensive production. Additional electrical insulation of the contact units is not required because the contact unit carrier is made of the dielectric material.

An upper surface of the base frame and/or of the contact unit carrier can be covered by a housing plate made of a dielectric material. The housing plate can have passage openings through which the respective contact elements can pass and protrude beyond a surface or upper surface of the housing plate. The dielectric material of the housing plate can be a plastic material, for example a fiber-reinforced plastic material. In this case, the housing plate can fully cover the contact unit carrier and the base frame or also be formed in several parts, such that the contact unit carrier alone and/or the base frame can be covered by the housing plate. Preferably, the housing plate is completely flat, significantly facilitating production of the contact device.

A passage opening through which connecting leads of the contact elements can be guided out of the base frame can be formed in a lateral surface of the base frame. In this case, installing connecting leads below the ground is not required; instead, the connecting leads can also be installed on the ground, for instance having a protective cover. It is then possible to drive over the contact device with a vehicle without connecting leads becoming stuck or being damaged by the base frame. The passage opening can be formed in the shape of an oblong hole in a profile of the base frame, for example. The lateral surface can be a short or long lateral surface of the rectangular base frame.

Furthermore, a holding frame for housing the contact unit carrier can be formed within the base frame. The holding frame can also be integrated in the base frame or be formed by the base frame. Depending on the outer dimensions of the base frame, the holding frame can also be connected to the base frame via braces. Overall, the holding frame thus allows exact positioning and secure attachment of the contact unit carrier. The contact unit carrier can simply be screwed into the holding frame.

A contact element of the contact unit can be mounted on a pivot bearing of the contact unit so as to be pivotable relative to the contact unit carrier. It is thus possible to easily ensure mobility of the contact element. Compared to contact element guides known from the state of the art, a risk that the contact element becomes stuck on the pivot bearing is significantly lower. Moreover, a pivot bearing is particularly simple to produce and can easily be protected against environmental conditions. On the whole, maintenance intervals for inspection and, if required, replacement of the contact unit can be significantly extended. Furthermore, blockage of the contact element is highly unlikely, allowing the contact device to be operated more reliably.

Advantageously, the contact element may be formed by a lever arm which is connected to the pivot bearing, said lever arm having a bolt-shaped contact bump, said bolt-shaped contact bump forming a contact surface for contacting the charging contact and being pivotable on the pivot bearing in the direction of its longitudinal axis. In that case, the contact element is particularly simple to produce and, for example, a point contact with a charging contact of a charging contact device can be established. It is also advantageous for the bolt-shaped contact element to have rounded edges or to be fully rounded at its contact end. In that case, the contact element can be moved along a charging contact without the charging contact or the contact element sustaining any major mechanical damage. Alternatively, the contact element can have any other suitable shape. If the bolt-shaped contact bump is pivotable on the pivot bearing in the direction of its longitudinal axis, the longitudinal axis extends transversely at all times, preferably at an angle of 90° relative to the pivot bearing. The bolt-shaped contact bump can be formed such that the longitudinal axis is disposed in the manner of a tangent of a pivoting radius of the pivot bearing. The lever arm connects the contact bump to the pivot bearing. Furthermore, the contact element can be made of copper or a copper alloy and/or not be plated with silver. Copper is particularly suitable for use in electrically conductive components, which is why the connecting lead may also be made of copper. Copper alloys in particular have a comparatively high wear resistance and tarnish resistance. Since current does not have to be transmitted from a surface of the contact element to the pivot bearing, silver plating of the contact element can be entirely omitted, which reduces the production costs for the contact element substantially.

The connecting lead can be directly attached to the contact element. In contrast to contact elements having a contact element guide known from the state of the art, it is then no longer necessary to utilize a gap between the contact element guide and the contact element for transmitting currents. In this case, the connecting lead can also be moved together with the contact element. Furthermore, conductive greases or other components for facilitating current transmission in the area of a contact element guide or the pivot bearing are no longer necessary. A transition resistance between the connecting lead and the contact element can thus be decreased substantially.

The connecting lead can have a conductor cross section of at least 50 mm$^2$, preferably 95 mm$^2$. This allows the contact unit to transmit particularly high currents. In the contact units known from the state of the art, multiple connecting leads are screwed to a contact element guide via cable lugs. If the connecting lead is directly attached to the contact element, higher currents can be transmitted via the connecting lead, which is why a conductor cross section of this size can be selected. Undesired heating of the terminal lead can be prevented in this way. A cross-sectional shape of the terminal lead is basically arbitrary, which is why the terminal lead can also be a stranded wire band, for example. In principle, however, the connecting lead can be formed having any conductor cross section.

The pivot bearing can have a bearing bush made of a dielectric material on an axis of the pivot bearing. In principle, any material can be selected for the bearing bush, in which case the bearing bush can be made of aluminum, a plastic material or another dielectric material. This is possible because excessive heating of the contact unit in the area of the pivot bearing due to transition resistance is not to be expected if a connecting lead is directly attached to the contact element. A bearing bush can be made of a material having favorable sliding or sealing properties, such as PTFE. The axis of the pivot bearing can be formed particularly simply by a bolt or a screw. By using a bearing bush made of a dielectric material, it is also possible to electrically disconnect the contact element from the other components of the contact unit.

A spring of the contact unit can exert a spring force on the contact element, such that the contact element is pushed in the direction of a charging contact. The contact element can be elastically mounted using a simple compression spring, in particular a coil spring, on the contact element or in the area of the pivot bearing. As a result, a point contact with a charging contact can be established under spring pre-load. A spring force can be selected such that the contact element is pushed in the direction of the charging contact and into a front end position whenever the contact element is not in contact with a charging contact.

Furthermore, the contact element can alternatively be formed by a seesaw element connected to the pivot bearing, in which case a contact bump can be disposed at a contact end of the seesaw element and the spring can be disposed on a spring end of the seesaw element. In this case, the spring can also be a spiral spring or a leaf spring realized in the manner of a compression spring. The seesaw element can be formed by two lever arms, a bolt-shaped contact bump being disposed on one lever arm and the spring being disposed on the lever arm located opposite on the pivot bearing. A length of the respective lever arms can be dimensioned in such a manner that a spring force of desired magnitude is exerted on the contact element. When the seesaw element is used, the contact device can be relatively flat because the seesaw element requires little structural space in terms of height. Overall, this allows a relatively great contact force to be realized via the spring force and a relatively large contact stroke of the contact element to be realized in the direction of its charging contact at little structural height.

The spring can be a coiled torsion spring which can be mounted on an axis of the pivot bearing. The torsion spring can be coiled around the axis of the pivot bearing in the manner of a coil spring. Respective ends of the spring can be formed so as to be free in a radial direction such that the ends of the spring can be pivoted relative to each other around the axis while generating a spring force. An end of the torsion spring can be in contact with or fastened to the contact element, in which case a different end of the torsion spring can be fastened on the pivot bearing or on another component of the contact unit, for example a connecting element. This allows the contact element on the pivot bearing to be easily pivoted into an end position by means of the thus generated spring force.

The pivot bearing can have an electric resistance heating element. The electric resistance heating element can be formed in the manner of a heating bush or a heating cartridge, for example. A heating cartridge can be inserted into a hole within an axis of the pivot bearing or into a hole within a bearing housing of the pivot bearing in a simple manner. Thus, it is possible to effectively prevent the pivot bearing from freezing even at low temperatures.

The contact unit can comprise a connecting element, the contact element being disposable on the contact unit carrier by means of the connecting element and being connected to the connecting element via the pivot bearing. Accordingly, the pivot bearing having the connecting element can be attached to the contact unit carrier such that the contact element is pivotable on the contact unit carrier. In a particularly simple embodiment, the connecting element can be attachable to the contact unit carrier by means of a screw connection and form an axis onto which the contact element can easily be mounted. The axis can also be a screw which is inserted into a hole or passage opening in the connecting element.

The contact unit can be configured in such a manner that a current of 500 A to 1,000 A at a voltage of up to 1,500 V, preferably 350 A at a voltage of 440 V, can be transmitted via the contact unit. Consequently, a power of 750 kW to 1500 kW, preferably of 150 kW, can be transmitted via the contact unit. Hence, a single connecting lead for connection to the contact element may suffice. Also, the vehicle can be charged faster because higher currents can be transmitted in less time. If applicable, the number of contact units on a contact unit carrier may even be reduced, making production of the contact device more cost-effective.

At least two contact elements can protrude at different heights relative to an upper surface of the contact unit carrier, said surface facing the charging contact unit. During the establishment of at least two contact pairs between a contact element and a charging contact each, this allows a defined sequence in the production of the contact pairs to be ensured. When the contact unit carrier and the charging contact device are being joined, a sequence of contacts is maintained by design at all times and ensured by the geometric arrangement of the contact elements relative to the upper surface or surface of the contact unit carrier. Unintentional or erroneous contact establishment or formation of contact pairs can easily be prevented in this way.

The fast charging system according to the invention comprises a contact device according to the invention and a charging contact device, the charging contact device being disposable on a vehicle floor of a vehicle and having charging contacts which are electrically connectable to respective contact units of the contact device.

The charging contacts can be formed by circuit boards, the circuit boards being disposable on a charging contact carrier of the charging contact device, said charging contact carrier being made of a dielectric material. The circuit boards can be metal plates which can be disposed on or integrated into the dielectric material so as to be spaced apart from each other. A surface of a lower surface of the circuit boards can be essentially flat and comparatively large relative to the contact elements, such that when the vehicle is being positioned above the contact device, any inaccuracies can be compensated and, at the same time, incorrect contacting does not occur. It can also be envisaged that the fast charging system enables a charging process of the vehicle irrespective of direction, i.e., irrespective of the side from which the vehicle is driven over the contact device. When the contact device is essentially rectangular, the charging contact device or the charging contact carrier can also be rectangular, such that the contact device and the charging contact device with their respective longitudinal axes are disposed in the direction of the longitudinal extension of the vehicle during a charging process. Since the charging contact carrier is made of a dielectric material, it can electrically insulate the circuit boards from a vehicle body or vehicle frame appropriately. For example, the charging contact carrier can also form a housing in which connections of the circuit board are disposed. Such a housing can be assembled and disassembled particularly simply on an underbody of a vehicle.

The contact device or the charging contact device can have the positioning device, the positioning device being formed by a pantograph, a pivot lever or a rocker by means of which the contact device or the charging contact device can be positioned in at least a vertical direction. In the case of a rocker, a supplementary linkage can be provided which can align the contact device or the charging contact device in the appropriate direction. Lever-based positioning devices can simply be provided with an appropriate mechanical drive and can be produced particularly inexpensively.

Alternatively, the charging contact device can comprise the positioning device, the positioning device being formed by a level control of the vehicle by means of which the charging contact device can be positioned in at least a vertical direction. A level control of a vehicle is well known and is used for adjusting a vehicle or a vehicle floor above a ground by lowering or raising it. A level control can be realized by means of a pneumatic chassis suspension of a vehicle, for instance. It is then also possible to lower the vehicle together with the charging contact device onto the contact device for a charging process by means of the level control.

Furthermore, the contact device and/or the charging contact device can each comprise a protective device having at least one moveable plate by means of which an upper surface of the contact elements or a lower surface of the charging contacts can be fully covered. The plate can be disposed in a displaceable manner or the protective device can have a plurality of corresponding plates which, when provided with an appropriate drive, can cover the upper surface of the contact elements or the lower surface of the charging contacts to such an extent that they are protected against pollution and detrimental environmental impacts when the fast charging system is not in use.

The contact device and the charging contact device can each have a transponder unit, the transponder units being able to be coupled to each other and data being able to be transmitted between the transponder units. The transponder units can establish a data link between the contact device and the charging contact device by means of induction or standardized radio connection technologies such that an exact relative position of the charging contact device above the contact device can be monitored or even controlled by means of the respective positions of the transponder units. Simultaneously, it is also possible to transmit controlling signals or consumption data for billing a charging process via this link.

Other advantageous embodiments of a fast charging system are apparent from the claims dependent on claim 1.

In principal, the invention is applicable to any type of electric vehicle that is battery-operated and has to be recharged.

BRIEF DESCRIPTION OF THE DRAWING FIGURES

Hereinafter, preferred embodiments of the invention will be explained in more detail with reference to the accompanying drawings.

FIG. 1 is a bottom view of a charging contact device, facing a contact device;

FIG. 2 is a side view of the charging contact device;

FIG. 3 is a left side view of the charging contact device;

FIG. 4 is a top view of the charging contact device, facing a vehicle;

FIG. 5 is a top view of a first embodiment of a contact device;

FIG. 6 is a side view of the contact device of FIG. 5;

FIG. 7 is a left side view of the contact device of FIG. 5;

FIG. 8 is a top view of a second embodiment of a contact device;

FIG. 9 is a side view of the contact device of FIG. 8;

FIG. 10 is a left side view of the contact device of FIG. 8;

FIG. 11 is a side view of a fast charging system in an approach position;

FIG. 12 is a left side view of the fast charging system of FIG. 11;

FIG. 13 is a side view of the fast charging system in a contact position;

FIG. 14 is a left side view of the fast charging system of FIG. 13;

FIG. 15 is a side view of the fast charging system in a contact position;

FIG. 16 is a left side view of the fast charging system of FIG. 15;

DETAILED DESCRIPTION OF THE INVENTION

Figure 17:
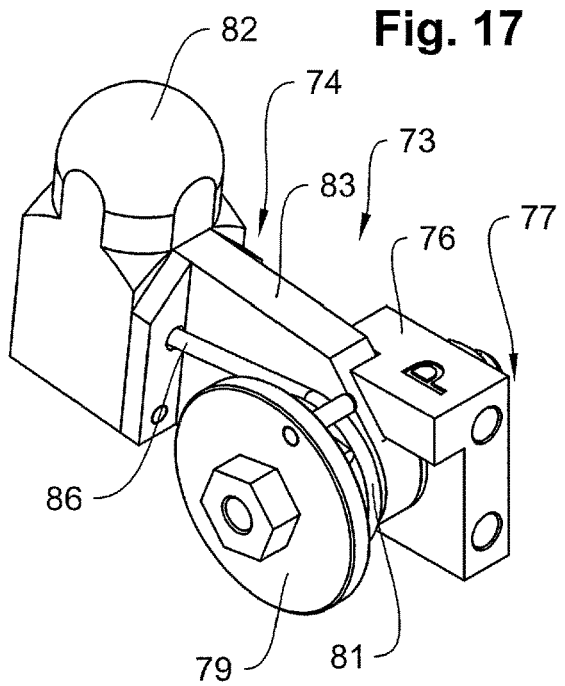
FIG. 17 is a perspective view of a contact unit.

A combined view of FIGS. 1 to 4 shows a charging contact device 10 which is disposed on a vehicle floor of a vehicle (not shown) and which has charging contacts 11 which can each be contacted with a contact unit (also not shown) of the contact device. Charging contacts 11 are realized by circuit boards 12 which are made of metal and and each form a charging contact surface 13. Charging contacts 11 are inserted into a charging contact carrier 14 of charging contact device 10 made of a dielectric material, in particular plastic, and are supported in this manner. On a rear side 15 (facing the vehicle) of charging contact device 10, connecting contacts 16 for connecting leads (not shown) are provided on circuit boards 12. Furthermore, a transponder unit 17 for wireless data transfer with a transponder unit (not shown) of a contact device is disposed on rear side 15. A frame 18 of charging contact device 10 can be seen on rear side 15, frame 18 being formed by two longitudinal braces 19 and two cross braces 20. On frame 18, a housing plate 21 of charging contact device 10 is disposed which has recesses 22 for housing charging contacts 11. A lower surface 23 of charging contact device 10 is essentially flat. Charging contact device 10 with its longitudinal axis 24 is disposed below a vehicle in such a manner that longitudinal axis 24 is positioned so as to be centered below the vehicle and extend in a moving direction.

A combined view of FIGS. 5 to 7 shows a contact device 25 having a contact unit carrier 26 which has contact units 27. Contact units 27 can be contacted with charging contacts (not shown) of a charging contact device. Furthermore, contact device 25 is formed by a base frame 29 which is attachable to a ground 28, contact unit carrier 26 being inserted into base frame 29. Contact unit carrier 26 is made of a dielectric material, in particular plastic. In a housing plate 30 of contact unit carrier 26, passage openings 31 are formed, through which contact elements 32 of contact units 27 can pass and protrude beyond an upper surface 33 of contact device 25. Contact units 27 or contact elements 32 are formed so as to be moveable relative to contact unit carrier 26. Furthermore, contact elements 32 protrude beyond housing plate 30 or upper surface 33 at different heights, such that when a contact connection or contact pair is being formed, the contact pairs are formed in a defined order. Base frame 29 has feet 34 which each have a hole 35 via which contact device 25 can be attached to or screwed into ground 28.

A combined view of FIGS. 8 to 10 shows a contact device 36 which is formed by a base frame 37 and a contact unit carrier 38 which is inserted into said base frame 37. Contact unit carrier 38 is made of a dielectric material, base frame 37 being formed by longitudinal profiles 39 and cross profiles 40 which are welded together. Contact unit carrier 38 is inserted into a holding frame 41 of base frame 37 and is formed by a trough 42 having crosspieces 43 and 44 disposed therein. On a crosspiece 43, contact units 45 are attached by means of screws. A passage opening 47 for the passage of connecting leads (not shown) is formed in a longitudinal profile 39 or a lateral surface 46 of base frame 37. Furthermore, a housing plate (not shown) of contact unit 36 for covering or forming an upper surface 48 of contact device 36 is provided. Contact elements 49 of contact units 45 also protrude beyond upper surface 48.

A combined view of FIGS. 11 to 16 shows a fast charging system 50 having a charging contact device 51 and a contact device 52 in different positions. Contact elements 54 protrude beyond an upper surface 53 of contact device 52 at different heights and a lower surface 55 of charging contact device 51 has charging contacts (not shown) which are each positioned above a contact element 54. Charging contact device 51 is disposed on a vehicle (not shown) and is lowered onto contact device 52 by means of a level control of the vehicle. After contact pairs have been formed between contact elements 54 and the charging contacts in a defined order, lower surface 55 comes into contact with upper surface 53. Contact elements 54 are formed so as to be moveable, such that they are sunk within contact device 52 by lowering charging contact device 51.

Figure 18:
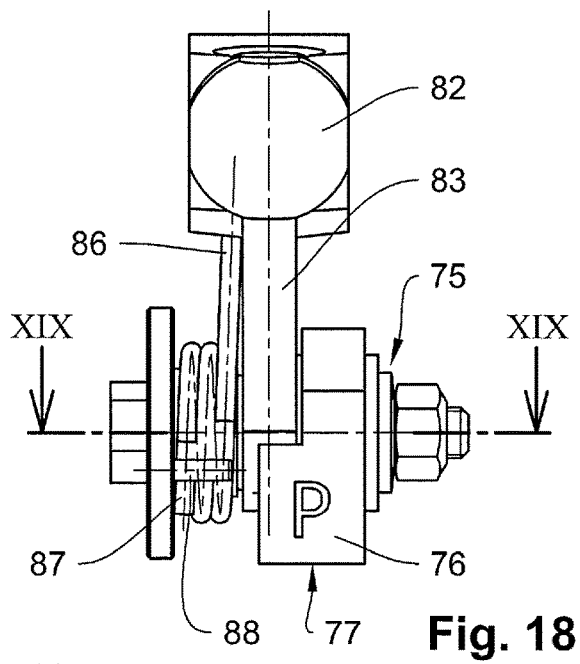
FIG. 18 is a top view of the contact unit of FIG. 17.
Figure 19:
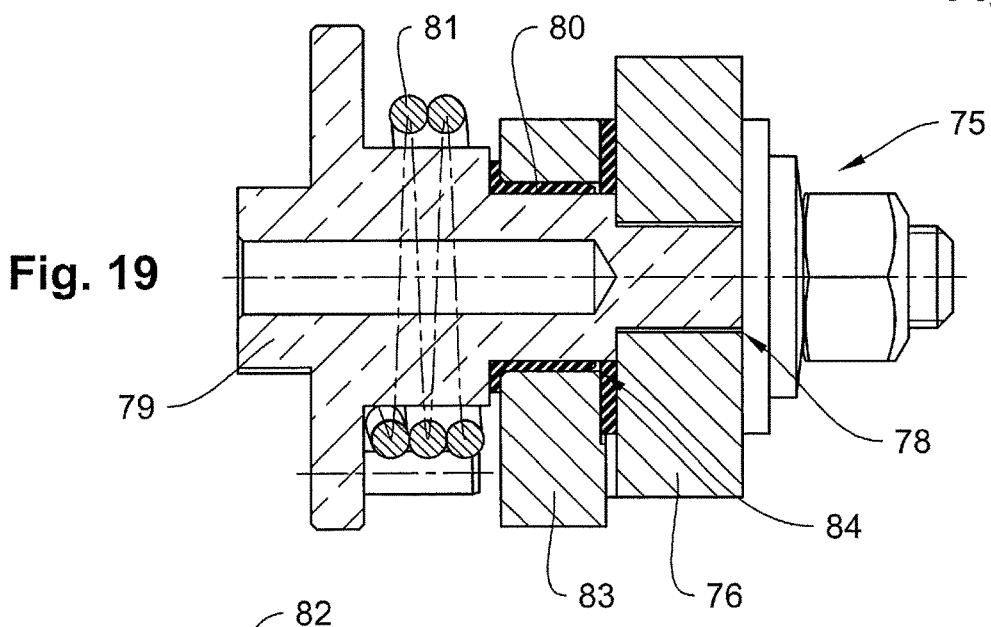
FIG. 19 is a sectional view along a line XIX-XIX of FIG. 18.
Figure 20:
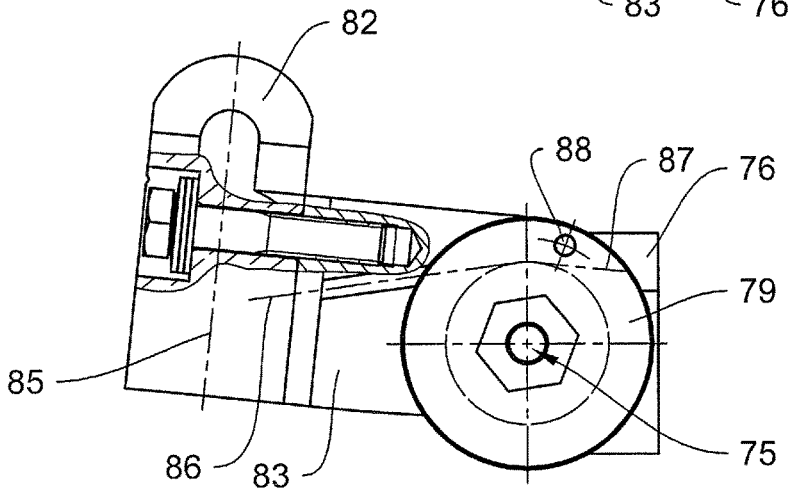
FIG. 20 is a side view of the contact unit of FIG. 17.

A combined view of FIGS. 17 to 20 shows a contact unit 73 which is formed by a contact element 74, a pivot bearing 75 and a connecting element 76. In this case, end 77 of connecting element 76 is attachable to a side wall (not shown) of a body of a contact unit carrier or of a contact device. A passage opening 78 is formed in connecting element 76, an axis 79 of pivot bearing 75 being inserted and screwed into passage opening 78. A bearing shell 80 and a spring 81 are disposed on axis 79. In this case, contact element 74 is formed in two pieces by a bolt-shaped contact bump 82 and a lever arm 83 which are screwed to each other. Lever arm 83 also has a passage opening 84 and lever arm 83 is mounted on bearing shell 80 by passage opening 84. Thus, bolt-shaped contact bump 82 is pivotable around pivot bearing 75 in the direction of its longitudinal axis 85. A spring end 86 of spring 81 is in contact with or attached to lever arm 83, another spring end 87 being attached to a bolt 88 of axis 79. In this case, a spring force acting on lever arm 83 and thus in the direction of longitudinal axis 85 can be exerted by means of a pre-load of spring 81.

Figure 21:
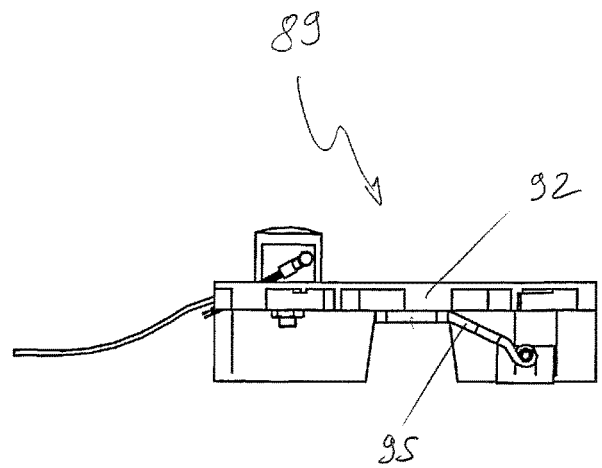
FIG. 21 is a front view of another contact unit.
Figure 22:
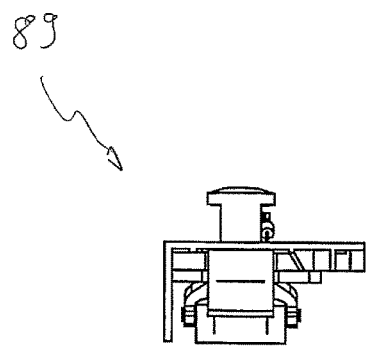
FIG. 22 is a left side view of the contact unit of FIG. 21.
Figure 23:
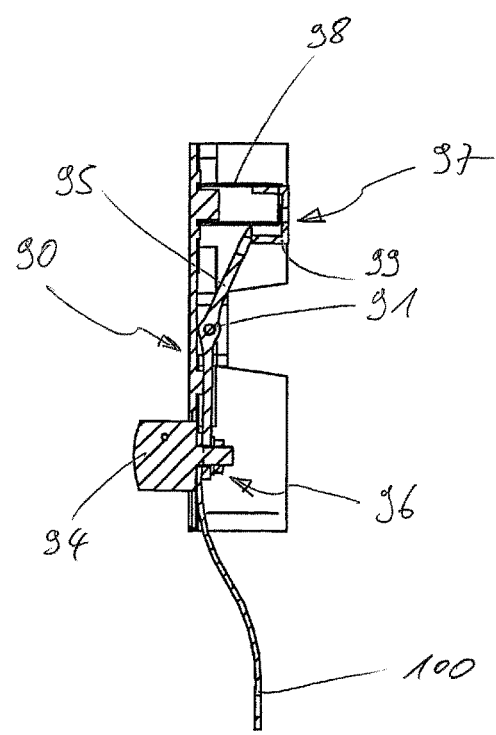
FIG. 23 is a sectional view along a line XXIII-XXIII of FIG. 24.
Figure 24:
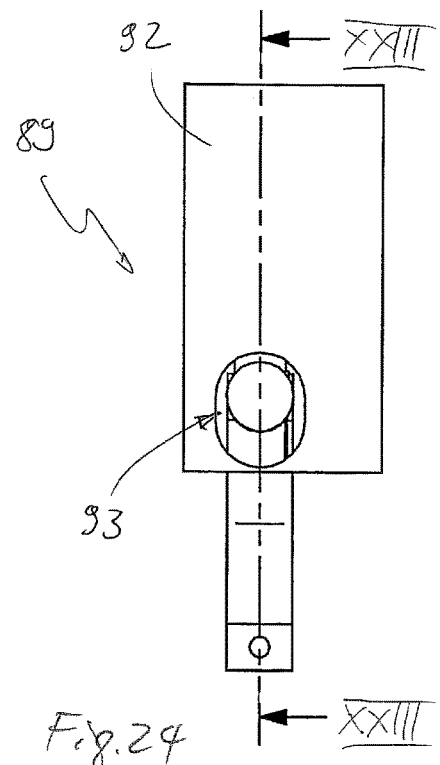
FIG. 24 is a top view of the contact unit of FIG. 21.

A combined view of FIGS. 21 to 24 shows a contact unit 89 formed by a contact element 90, a pivot bearing 91 and a housing element 92. Housing element 92 can be mounted within a frame or contact unit carrier (not shown). A passage opening 93 penetrated by a bolt-shaped contact bump 94 of contact element 90 is formed in housing element 92. Contact bump 94 is attached to a seesaw element 95 of contact element 90, in particular to a contact end 96 of seesaw element 95. Seesaw element 95 is mounted on pivot bearing 91 so as to be pivotable, a spiral spring 98 being disposed on a spring end 97 of seesaw element 95 opposite contact end 96 and being housed in a spring support 99. Furthermore, a connecting lead 100 is disposed on contact bump 94. A spring force which can push contact bump 94 against a charging contact (not shown) is exerted by spiral spring 98.

The invention claimed is:

1. A contact device (25, 36, 52) for a fast charging system (50) for electrically driven vehicles, the fast charging system comprising a charging contact device (10, 51) which is disposable on a vehicle floor of a vehicle and the contact device having a contact unit carrier (26, 38), the contact unit carrier having contact units (27, 45, 73, 89), each contact unit being electrically connectable to a respective charging contact (11) of the charging contact device to form a contact pair, the contact device or the charging contact device comprising a positioning device, the contact units being positionable relative to the charging contacts by means of the positioning device in such a manner that an electrically conductive connection is formed between the vehicle and a stationary charging station
wherein the contact device is disposable on a ground (28) below the vehicle onto which the vehicle can drive, the contact device having a base frame (29, 37) which is attachable to the ground, the contact unit carrier being inserted into the base frame, the contact unit carrier being made of a dielectric material, the contact units each having a contact element (32, 49, 54, 74) which is moveable relative to the contact unit carrier.

2. The contact device according to claim 1, wherein the contact device (25, 36, 52) is formed so as to be accessible to or driven over by the vehicle.

3. The contact device according to claim 1, wherein the base frame (29, 37) is made of a dielectric material.

4. The contact device according to claim 1, wherein the base frame (29, 37) is formed by metal profiles (39, 40).

5. The contact device according to claim 1, wherein the contact unit carrier (26, 38) is formed by a trough (42) within which the contact units (27, 45, 73, 89) are disposed.

6. The contact device according to claim 1, wherein vertical crosspieces (43, 44) to which the contact units (27, 45, 73, 89) are attached are formed within the contact unit carrier (26, 38).

7. The contact device according claim 1, wherein an upper surface (33, 48, 53) of the base frame (29, 37) and/or of the contact unit carrier (26, 38) are/is covered by a housing plate (30) made of a dielectric material.

8. The contact device according to claim 1 wherein a passage opening (47) through which connecting leads of the contact elements (32, 49, 54, 74, 90) are guided out of the base frame is formed in a lateral surface (46) of the base frame (29, 37).

9. The contact device according to claim 1, wherein a holding frame (41) for housing the contact unit carrier (26, 38) is formed within the base frame (29, 37).

10. The contact device according to claim 1, wherein a contact element (32, 49, 54, 74, 90) of the contact unit is mounted on a pivot bearing (75, 91) of the contact unit (27, 45, 73, 89) so as to be pivotable relative to the contact unit carrier (26, 38).

11. The contact device according to claim 10, wherein the contact element (32, 49, 54, 74, 90) is formed by a lever arm (83) which has a bolt-shaped contact bump (82, 94) and is connected to the pivot bearing (75, 91), the bolt-shaped contact bump forming a contact surface for contacting the charging contact (11) and being pivotable on the pivot bearing in the direction of its longitudinal axis (85).

12. The contact device according to claim 10, wherein a spring (81, 98) of the contact unit (27, 45, 73, 89) exerts a spring force onto the contact element (32, 49, 54, 74, 90), such that the contact element is pushed in the direction of a charging contact (11).

13. The contact device according to claim 12, wherein the contact element (32, 49, 54, 74, 90) is formed by a seesaw element (95) connected to the pivot bearing (75, 91), a contact bump (82, 94) being disposed at a contact end (96) of the seesaw element, the spring (81, 98) being disposed at a spring end (97) of the seesaw element.

14. The contact device according to claim 10, wherein at least two contact elements (32, 49, 54, 74, 90) protrude at varying heights relative to an upper surface (33, 48, 53) of the contact unit carrier (26, 38) which faces the charging contact device (10, 51).

15. A fast charging system (50) having a contact device (25, 36, 52) and a charging contact device (10, 51), the charging contact device being disposable on a vehicle floor of a vehicle and having charging contacts (11) which are each electrically connectable to a contact unit (27, 45, 73) of the contact device, the contact device comprising a contact unit carrier (26, 38), the contact unit carrier having contact units (27, 45, 73, 89), each contact unit being electrically connectable to a respective charging contact (11) of the charging contact device to form a contact pair, the contact device or the charging contact device comprising a positioning device, the contact units being positionable relative to the charging contacts by means of the positioning device in such a manner that an electrically conductive connection is formed between the vehicle and a stationary charging station, wherein the contact device is disposable on a ground (28) below the vehicle onto which the vehicle can drive, the contact device having a base frame (29, 37) which is attachable to the ground, the contact unit carrier being inserted into the base frame, the contact unit carrier being made of a dielectric material, the contact units each having a contact element (32, 49, 54, 74) which is moveable relative to the contact unit carrier.

16. The fast charging system according to claim 15, wherein the charging contacts (11) are formed by circuit boards (12), the circuit boards being disposed on a charging contact carrier (14) of the charging contact device (10, 51), said charging contact carrier (14) being made of a dielectric material.

17. The fast charging system according to claim 15, wherein the contact device (25, 36, 52) or the charging contact device (10, 51) has the positioning device, the positioning device being formed by a pantograph, a pivot lever or a rocker by means of which the contact device or the charging contact device is positionable in at least a vertical direction.

18. The fast charging system according to claim 15, wherein the charging contact device (10, 51) comprises the positioning device, the positioning device being formed by a level control of the vehicle by means of which the charging contact device is positionable in at least a vertical direction.

19. The fast charging system according to claim 15, wherein the contact device (25, 36, 52) and/or the charging contact device (10, 51) each comprise a protective device having at least one moveable plate by means of which an upper surface (33, 48, 53) of the contact elements (32, 49, 54, 74, 90) or a lower surface (23, 55) of the charging contacts (11) is fully coverable.

20. The fast charging system according to claim 15, wherein the contact device (25, 36, 52) and the charging contact device (10, 51) each have a transponder unit (17), the transponder units being able to be coupled to each other and data being able to be transmitted between the transponder units.

* * * * *